(12) United States Patent
Im et al.

(10) Patent No.: US 7,746,423 B2
(45) Date of Patent: Jun. 29, 2010

(54) PHOTO-LUMINESCENT LIQUID CRYSTAL DISPLAY INCLUDING A BLUE DICHROIC MIRROR LAYER

(75) Inventors: Seoung-jae Im, Seoul (KR); Byung-ki Kim, Gunpo-si (KR); Jae-young Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 656 days.

(21) Appl. No.: 11/444,328

(22) Filed: Jun. 1, 2006

(65) Prior Publication Data

US 2006/0274226 A1    Dec. 7, 2006

(30) Foreign Application Priority Data

Jun. 2, 2005    (KR) .................. 10-2005-0047346

(51) Int. Cl.
*G02F 1/1335*    (2006.01)
(52) U.S. Cl. ........................ 349/71; 349/69; 349/70
(58) Field of Classification Search .................. 349/71, 349/69–70
See application file for complete search history.

(56) References Cited

U.S. PATENT DOCUMENTS

| 4,822,144 | A | | 4/1989 | Vriens |
| 4,830,469 | A | | 5/1989 | Breddels et al. |
| 4,882,617 | A | * | 11/1989 | Vriens ........................ 348/779 |
| 5,029,986 | A | * | 7/1991 | De Vaan ...................... 349/113 |
| 5,608,554 | A | * | 3/1997 | Do et al. ........................ 349/70 |
| 6,340,824 | B1 | * | 1/2002 | Komoto et al. ................. 257/99 |
| 6,700,555 | B1 | * | 3/2004 | Jones ........................... 345/76 |
| 2002/0145685 | A1 | * | 10/2002 | Mueller-Mach et al. ....... 349/61 |
| 2005/0062903 | A1 | * | 3/2005 | Cok et al. ...................... 349/69 |

\* cited by examiner

*Primary Examiner*—David Nelms
*Assistant Examiner*—Lauren Nguyen
(74) *Attorney, Agent, or Firm*—Cantor Colburn LLP

(57) ABSTRACT

A photo-luminescent (PL) liquid crystal display (LCD) including a blue dichroic mirror layer disposed under a light emitting layer is provided. Visible light generated from the light emitting layer is mostly reflected to the front side of the PL LCD, thereby increasing the light utilization efficiency thereof. A blue PL quantum dot layer is formed in blue light regions, thereby improving a narrow viewing angle and an orientation in blue pixels. An ultraviolet (UV) filter blocking UV light in the ambient light is formed to protect the light emitting layer from the excitation caused by external light, thereby preventing degradation of contrast caused by an undesired light emission.

15 Claims, 7 Drawing Sheets

PHOTO-LUMINESCENT LIQUID CRYSTAL DISPLAY INCLUDING A BLUE DICHROIC MIRROR LAYER

CROSS-REFERENCE TO RELATED PATENT APPLICATION

This application claims the benefit of Korean Patent Application No. 10-2005-0047346, filed on Jun. 2, 2005, in the Korean Intellectual Property Office, the disclosure of which is incorporated herein in its entirety by reference.

BACKGROUND OF THE DISCLOSURE

1. Field of the Disclosure

The present disclosure relates to a liquid crystal display (LCD), and more particularly, to a photo-luminescent (PL)-LCD with high light utilization efficiency.

2. Description of the Related Art

LCDs are non-emissive displays that require a separate backlight unit and red, green, and blue color filters for pixels to display a color image on a screen.

The red, green, and blue color filters respectively separate white light emitted from the backlight unit into red, green, and blue lights. The red, green, and blue color filters each transmit only light of a specific wavelength, which is one third of that of white light, resulting in significant optical loss. Thus, a high luminance backlight unit is required to produce an image with sufficient luminance.

U.S. Pat. Nos. 4,822,144 and 4,830,469 disclose PL LCDs using phosphors excited by ultraviolet (UV) light and having higher light utilization efficiency than LCDs using color filters.

Also, in U.S. Patent Publication No. 2002/0145,685, Regina et al. propose a PL LCD using a backlight unit and red and green phosphors. Blue color is obtained by switching light paths using liquid crystals instead of a color filter or phosphors. The red and green phosphors are excited by blue backlight emitted from the backlight unit.

The drawback of the proposed PL LCD is that it has a narrow viewing angle and orientation because light emitted from a blue pixel has a polarization component. The blue pixel with the polarization component and narrow viewing angle has different optical characteristics than red and green pixels with no polarization component and a wide viewing angle.

The phosphors for the red and green pixels are excited by light emitted by the backlight unit as well as by ambient light incident from an external light source since the ambient light also contains blue UV light. The UV light contained in the ambient light unnecessarily excites the phosphors without contributing to displaying an image on the LCD, thereby degrading a contrast ratio.

Thus, research concerning improving light utilization efficiency is required to obtain a high quality image.

SUMMARY OF THE DISCLOSURE

The present invention may provide a photo-luminescent liquid crystal display (PL LCD) capable of displaying a high quality image.

The present invention also may provide a PL LCD having a high light utilization efficiency.

According to an aspect of the present invention, there is provided a PL LCD including: a backlight unit generating blue light; a liquid crystal layer defining a plurality of red, green, and blue pixels and modulating light generated from the backlight unit; a pixel switching part driving the liquid crystal layer with respect to each pixel; a light emitting layer respectively corresponding to the each pixel; and a blue dichroic mirror layer which is disposed between the light emitting layers and the backlight unit, and which transmits blue light from the backlight unit.

The light emitting layers may include phosphor layers corresponding to the red and green pixels.

The light emitting layer corresponding to the blue pixels may include blue PL quantum dots (QDs) which are excited by blue light emitted by the backlight unit and which emit blue light.

The blue light may have a wavelength of approximately 430 to 480 nm.

The backlight unit may include a blue light-emitting diode (LED) light source.

The blue PL QDs may be formed of cadmium sulfide (CdS).

The PL LCD may further include an ultraviolet (UV) filter blocking external UV light and preventing absorption of UV light into the light emitting layers.

The UV filter may use a chemical blocking agent absorbing UV light, such as para-aminobenzoic acid (PABA) derivatives, cinnamate derivatives, salicylic acid derivatives, benzophenone and its derivatives or antharanilate and its derivatives, or a physical blocking agent reflecting and scattering incident UV light, such as zinc oxide, titanium dioxide, iron oxide, or magnesium oxide.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF PREFERRED EMBODIMENTS

Hereinafter, the present invention will be described more fully with reference to the accompanying drawings, in which exemplary embodiments of the invention are shown.

Figure 1:
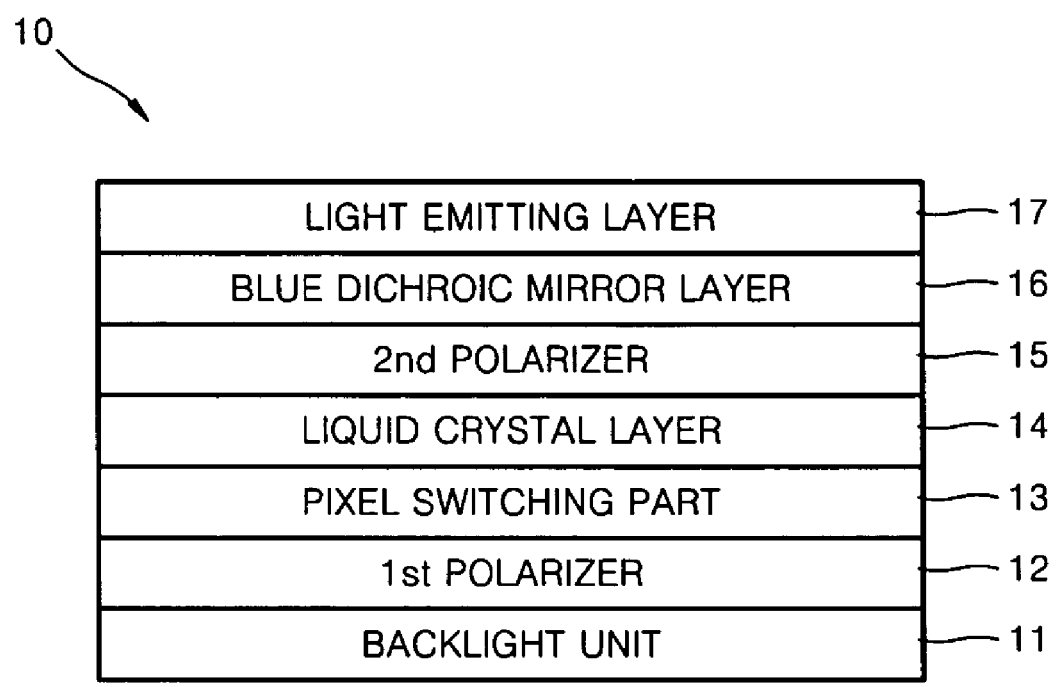
FIG. 1 is a cross-sectional view of a liquid crystal display (LCD) according to an embodiment of the present invention.

FIG. 1 is a cross-sectional view of a liquid crystal display (LCD) 10 according to an embodiment of the present invention. Referring to FIG. 1, the LCD 10 includes a backlight unit 11 generating blue light, a liquid crystal layer 14 modulating light generated from the backlight unit 11, a pixel switching part 13 driving the liquid crystal layer 14 with respect to each pixel, a light emitting layer 17 emitting light due to the blue light passing through the liquid crystal layer 14, a first polarizer 12 disposed between the pixel switching part 13 and the backlight unit 11, a second polarizer 15 disposed between the liquid crystal layer 14 and the light emitting layer 17, and a blue dichroic mirror layer 16. For convenience of explanation, a front plate and a rear plate are not illustrated in FIG. 1.

The backlight unit 11 includes a blue light emitting device (LED) emitting visible blue light having a wavelength of, for example, 460 nm. A liquid crystal light modulating unit including the pixel switching unit 13, the liquid crystal layer 14, and the polarizers 12 and 15 may have a passive STN LCD structure in which electrodes are simply arranged in an x-y matrix, or in an active matrix structure. The active matrix structure includes a plurality of pixel electrode arrays and thin film transistors (TFTs) respectively connected to pixel electrodes, which are well-known.

The blue dichroic mirror layer 16, which is a characteristic feature of the present invention, transmits blue light generated from the backlight unit 11 to the light emitting layer 17, and reflects light emitted from the light emitting layer 17 so as to enhance image quality. Generally, a dichroic mirror is a kind of filter which transmits light having a predetermined wavelength but reflects light having other wavelengths. The dichroic mirror is generally used in a multi-panel type projector in which white backlight is separated into red, green, and blue lights.

Figure 2:
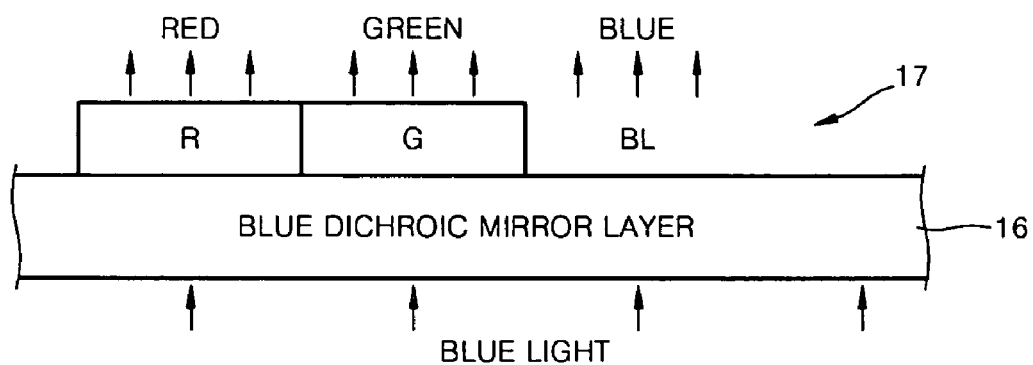
FIG. 2 is a cross-sectional view of an example of a blue dichroic mirror layer and a light emitting layer in the LCD of FIG. 1, according to an embodiment of the present invention.

FIG. 2 is a cross-sectional view of an example of the blue dichroic mirror layer 16 and a light emitting layer 17, according to an embodiment of the present invention. Referring to FIG. 2, the light emitting layer 17 includes red and green phosphor layers R and G respectively emitting red light and green light due to the blue light generated from the backlight unit 11. The blue pixel region BL may not have an additional light emitting layer because the blue light generated from the backlight unit 11 can be used. The red phosphor is selected from the group consisting of $(Sr,CaS):Eu^{2+}$, $(Sr,Ca)_2Si_5N_8:Eu^{2+}$, and $Mg_4GeO\ 5.5\ F:Mn^{4+}$. The green phosphor is selected from the group consisting of $SrGa_2S_4:Eu^{2+}$, $(Ba,Sr)SiO_4:Eu^{2+}$, $MgSi_2O_7$, $SrAl_2O_4:Eu^{2+}$, $Ca_8Mg(SiO_{44}Cl_2:Eu^{2+}$, and $(Cr,Ca)(Al,Si)_2:Eu^{2+}$.

Figure 3:
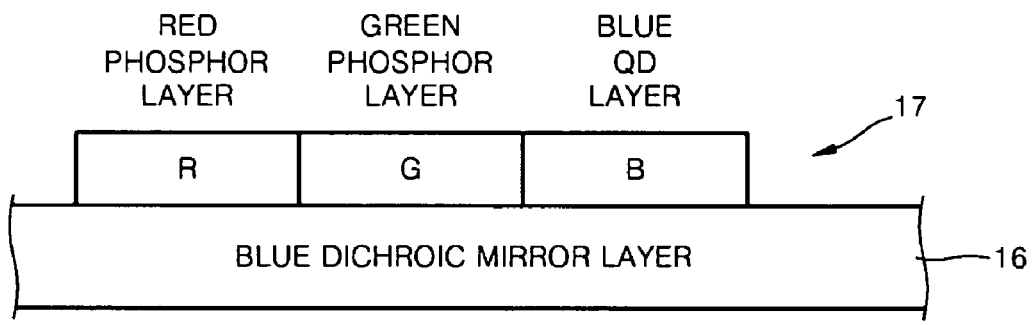
FIG. 3 is a cross-sectional view of another example of the blue dichroic mirror layer and a light emitting layer in the LCD of FIG. 1, according to another embodiment of the present invention.

FIG. 3 is a cross-sectional view of another example of the blue dichroic mirror layer 16 and a light emitting layer 17 according to another embodiment of the present invention. Referring to FIG. 3, the light emitting layer 17 includes the red and green phosphor layers R and G and a PL blue QD light emitting layer B (hereinafter, referred to as blue QD layer B) which receives the blue light generated from the backlight unit 11 and emits blue light. The blue QD layer B can improve a narrow viewing angle which may occur in the blank region (blue pixel region BL) described in the first embodiment. That is, the incident light passing through the liquid crystal layer 14 to the blue QD layer B is polarized, but the light emitted from the blue QD layer B does not have linear polarization components but instead has oval or circular polarization components. Thus, the narrow viewing angle due to the linear polarization does not occur in the light emitted from the QD light emitting unit B. Accordingly, as in the red and green phosphor layers R and G, the linear polarization components do not exist so that the light does not have orientation and a wide viewing angle can be provided.

The blue QDs in the blue QD layer B are formed of, for example, CdS. The blue QDs are exited due to the blue light having a wavelength 460 nm generated from the backlight unit 11, and then emit light having a wavelength of approximately 460 nm. The blue QDs are semiconductor particle quantum dots having a predetermined size and showing a quantum confinement effect. The diameter of the blue QDs is in the range from 1 to 10 nm. The blue QDs may be synthesized by a wet chemistry method. The wet chemistry method is a commonly known technique that allows particles to grow by mixing a derivative material in an organic solvent. For example, the blue QDs may be formed of a II-VI compound such as cadmium selenide (CdSe), cadmium telluride (CdTe), cadmium sulfide (CdS), zinc selenide (ZnSe), zinc telluride (ZnTe), zinc sulfide (ZnS), mercury telluride (HgTe), or mercury sulfide (HgS). The blue QDs may have a core-shell structure in which the core includes a compound selected from the group consisting of CdSe, CdTe, CdS, ZnSe, ZnTe, ZnS, HgTe, and HgS and the shell includes a compound selected from the group consisting of CdSe, CdTe, CdS, ZnSe, ZnTe, ZnS, HgTe, and HgS. The blue QDs may also be formed of a III-V compound such as gallium nitride (GaN), indium phosphide (InP), indium arsenic (InAs), gallium arsenic (GaAs), gallium phosphide (GaP), and gallium indium phosphide (GaInP).

Figure 4:
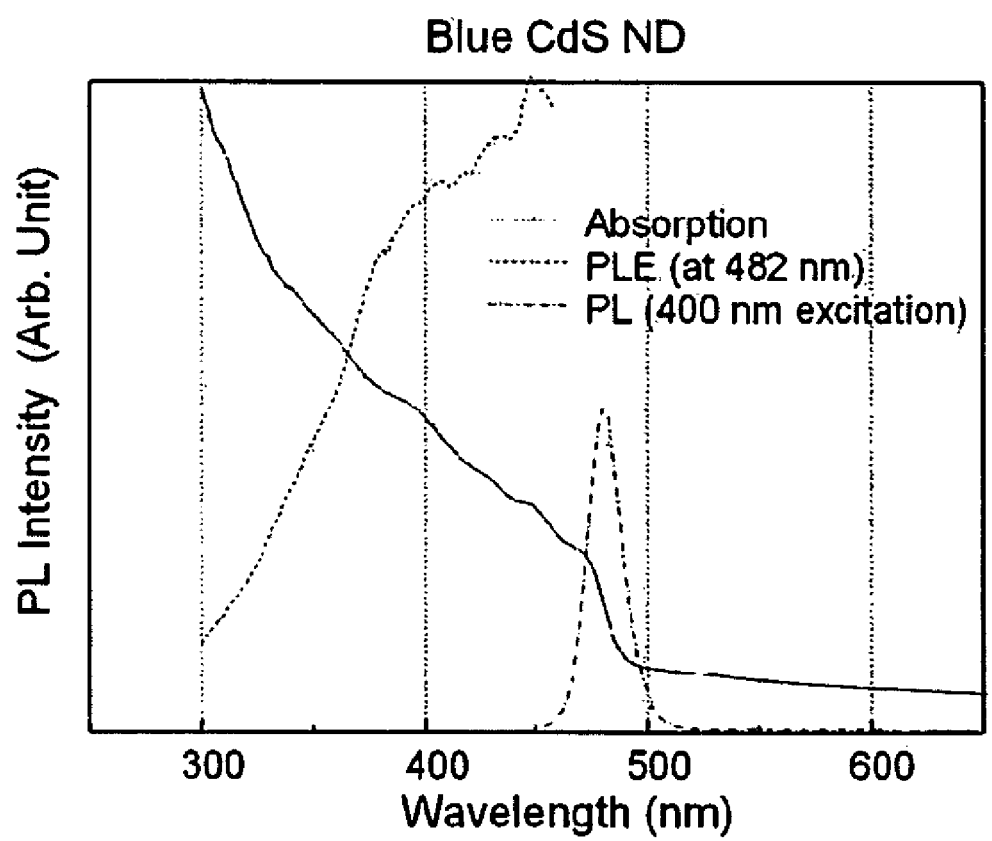
FIG. 4 is a graph of PL characteristics of a blue light emitting quantum dot material in the LCD of FIG. 3.

FIG. 4 is a graph of PL characteristics of a blue light emitting quantum dot material, i.e., CdS QDs. Referring to FIG. 4, since the CdS QDs absorb light having a wavelength of approximately 480 nm, the maximum PL intensity of the light is shown at near the wavelength of approximately 480 nm. Accordingly, blue polarized light can be converted to non-polarized light having a similar wavelength using such a characteristic of the QDs.

Figure 5:
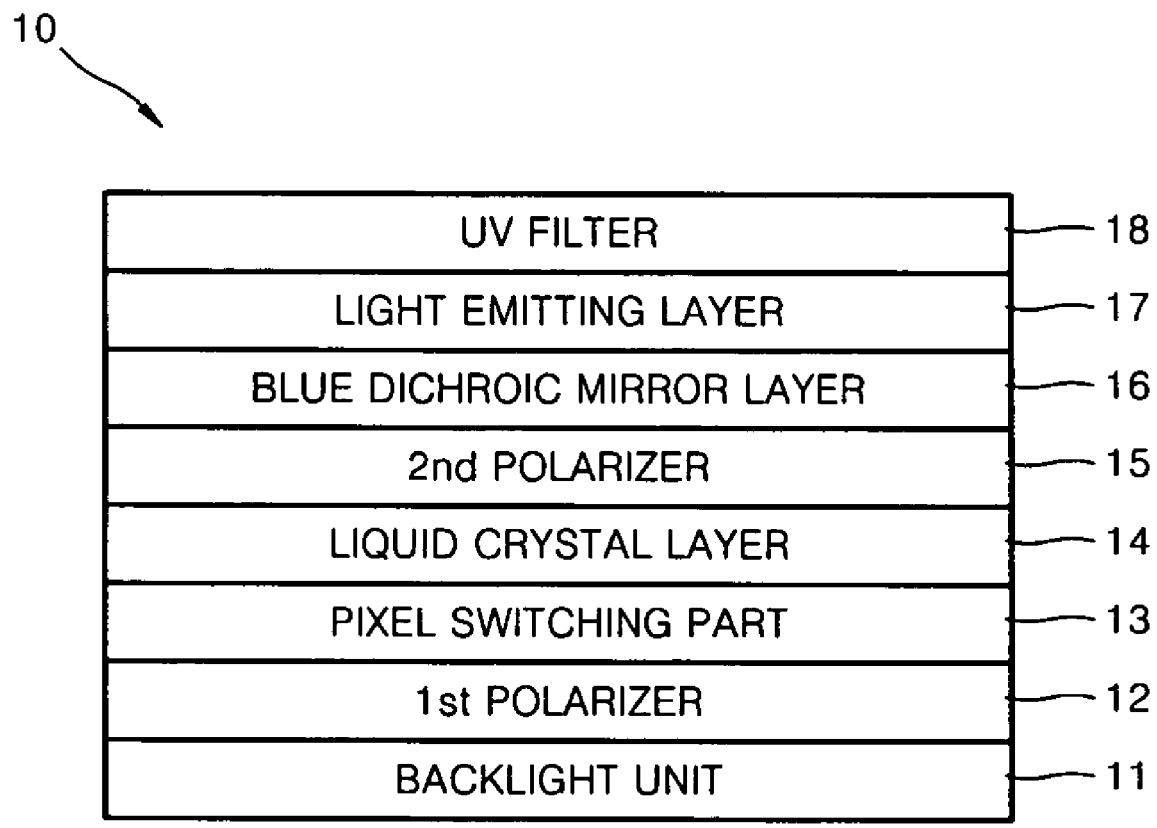
FIG. 5 is a cross-sectional view of an LCD according to still another embodiment of the present invention.

FIG. 5 is a cross-sectional view of an LCD according to still another embodiment of the present invention. Referring to FIG. 5, an ultraviolet (UV) filter 18 is disposed on a light emitting unit 17. The UV filter 18 blocks the light emitting layer 17 against the incidence of external UV light which may excite the light emitting layer 17 to unnecessarily emit light. The external UV light to be blocked has a near blue light wavelength, for example, shorter than approximately 400 nm, which is shorter than the wavelength of light emitted form the blue QDs, i.e., 460 nm.

Figure 6:
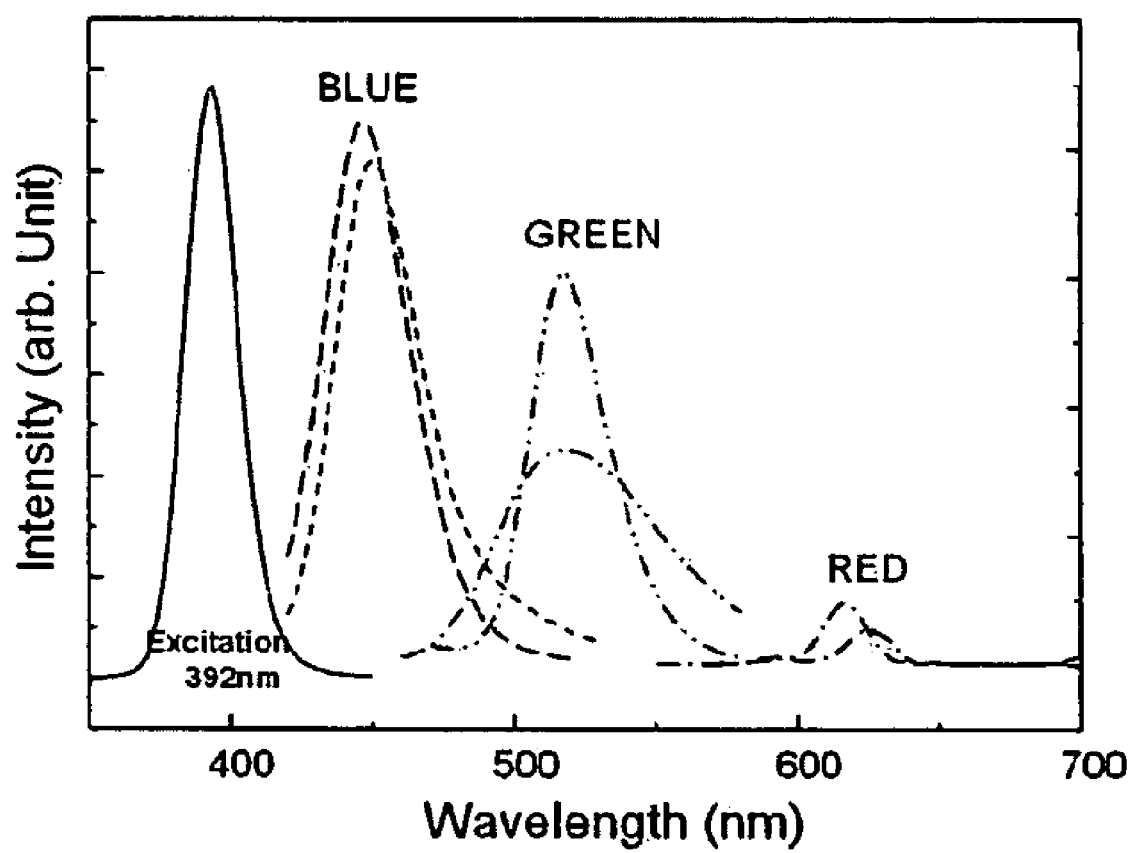
FIG. 6 is a graph of light emission intensities of conventional UV light activated phosphors excited by external UV light.

FIG. 6 is a graph of light emission intensities of conventional UV light activated phosphors excited by external UV light having a wavelength of 392 nm contained in ambient light such as bright illumination or sunlight. Two phosphors available from two different manufacturers were used as conventional UV light activated phosphors for each color and a 392 nm LED was used as a light source. Referring to FIG. 6, when ambient UV light having a wavelength of approximately 392 nm excited red, green, and blue phosphors, two different kinds of blue phosphors emitted the shortest wavelength blue lights having similar intensities. The two green phosphors available from different manufacturers respectively generated green lights with high and low intensities. The red phosphors emitted lights having very low intensities.

This intensity difference appears in a real LCD, and thus the color balance is degraded. To improve the color balance, the emission intensity of the red phosphors is increased by inserting QDs having high quantum efficiency (or light utilization efficiency) into the red phosphor which has the lowest quantum efficiency.

When a PL-LCD is exposed to an environment in which ambient light intensity is very high, light emission not contributing to displaying an image on a screen occurs across the entire surface of the display, thus degrading the contrast of each color. In particular, blue and green have a significantly lower contrast ratio than red.

Thus, the PL-LCD of the current embodiment of the present invention uses the UV filter 18 to prevent external light to enter the light emitting layer 17 of the LCD 10. As described above, the UV filter 18 uses a chemical or physical blocking agent to suppress degradation of the contrast ratio due to external light.

The UV filter 18 may include a chemical blocking agent for absorbing UV light, such as para-aminobenzoic acid (PABA) derivatives, cinnamate derivatives, salicylic acid derivatives, benzophenone and its derivatives, or antharanilate and its derivatives, or a physical blocking agent reflecting and scattering incident UV light, such as zinc oxide, titanium dioxide, iron oxide or magnesium oxide.

The light to be blocked by the UV filter 18 has a shorter wavelength than visible blue light having wavelengths of approximately 400 nm and which excites the phosphors. The visible light which is required to display an image is not blocked by the UV filter 18.

Figure 7:
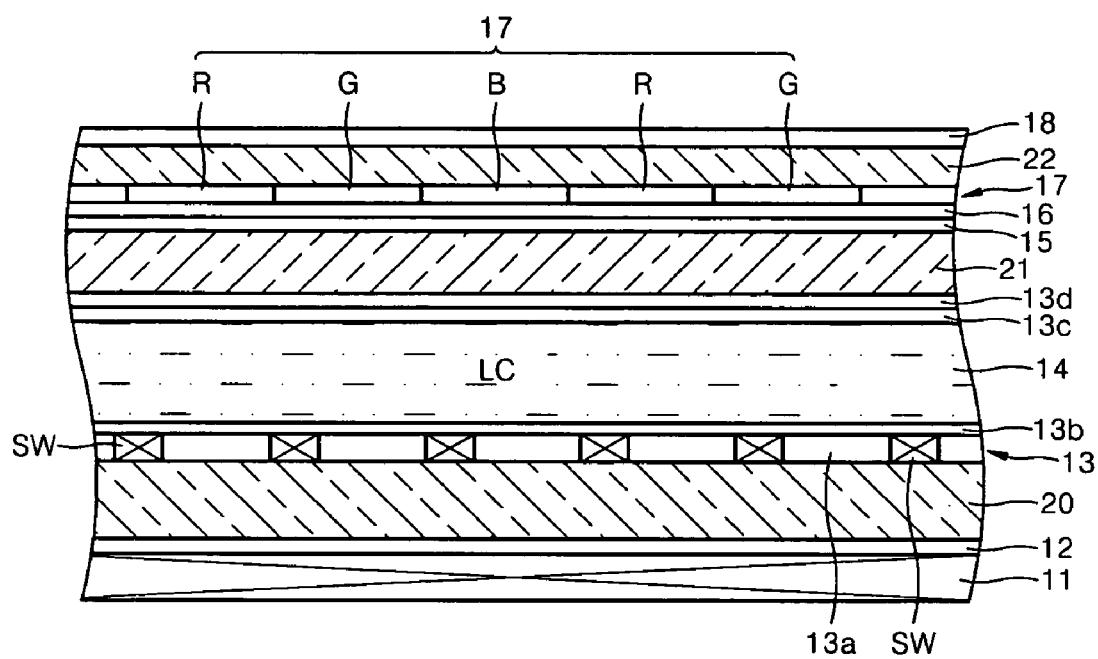
FIG. 7 is a cross-sectional view of an LCD according to yet another embodiment of the present invention.

FIG. 7 is a cross-sectional view of an LCD according to yet another embodiment of the present invention. Referring to FIG. 7, a front plate 21 and a rear plate 20 are separate from each other at a predetermined distance, and a liquid crystal (LC) layer 14 is disposed between the front plate 21 and the rear plate 20. A second polarizing panel 16 and a light emitting layer 17 including red and green phosphor layers R and G and blue QD layer B are formed on the outer surface of the front plate 21, and a protection panel 22 is formed thereon. A UV filter 18 is coated on the surface of the protection panel 22.

A common electrode 13d and an upper alignment layer 13c, which are components of an LC switching unit, are sequentially formed on the inner surface of the front plate 21. TFT switching elements SW and pixel electrodes 13a, which are other components of a LC switching unit, and a lower alignment layer 13b disposed thereon are formed on the inner surface of the rear plate 20. Red and green phosphor layers R and G and blue QD layer B in the light emitting layer 17 emit light due to the blue light generated from a backlight unit 11. For example, the blue QD layer B is excited due to the blue light having a wavelength of 460 nm generated from the backlight unit 11, thereby emitting light having a wavelength of approximately 460 nm.

Figure 8:
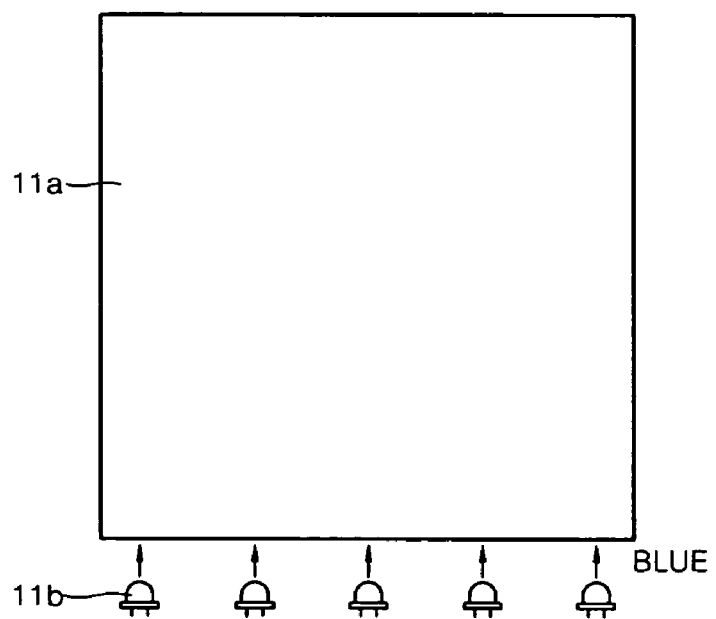
FIG. 8 illustrates an example of a backlight unit in the LCDs of FIGS. 1, 5, and 7, an embodiment of the present invention.

The backlight unit 11 and a first polarizer 12 are sequentially disposed on the rear plate 20. Referring to FIG. 8, the backlight unit 11 includes a light guide/diffusion member 11a and blue lamps 11b. The blue lamps 11b may be blue LEDs, as described above. The light guide/diffusion member 11a guides and uniformly diffuses the blue light emitted from the blue lamps 11b onto the rear plate 20.

The light guide/diffusion member 11a is optionally installed and the blue lamps 11b may be arranged on the entire surface of the rear plate 20. When the blue lamps 11b are LEDs, the plurality of LED lamps may be arranged parallel to each other in an edge of the light guide/diffusion member 11a, that is, an edge lighting manner, as shown in FIG. 8.

Figure 9:
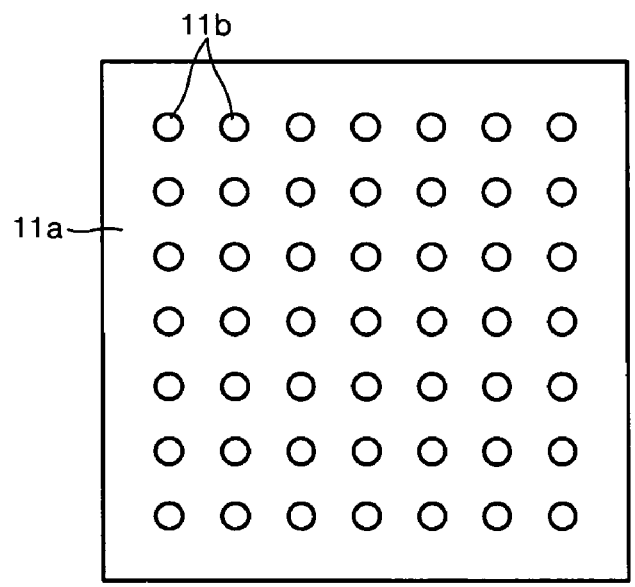
FIG. 9 illustrates another example of the backlight unit in the LCD of FIGS. 1, 5, and 7, an embodiment of the present invention.

According to another embodiment of the present invention shown in FIG. 9, a plurality of LEDs may be arranged on the entire surface of the light guide/diffusion member 11a in the rear plate 20.

Figure 10:
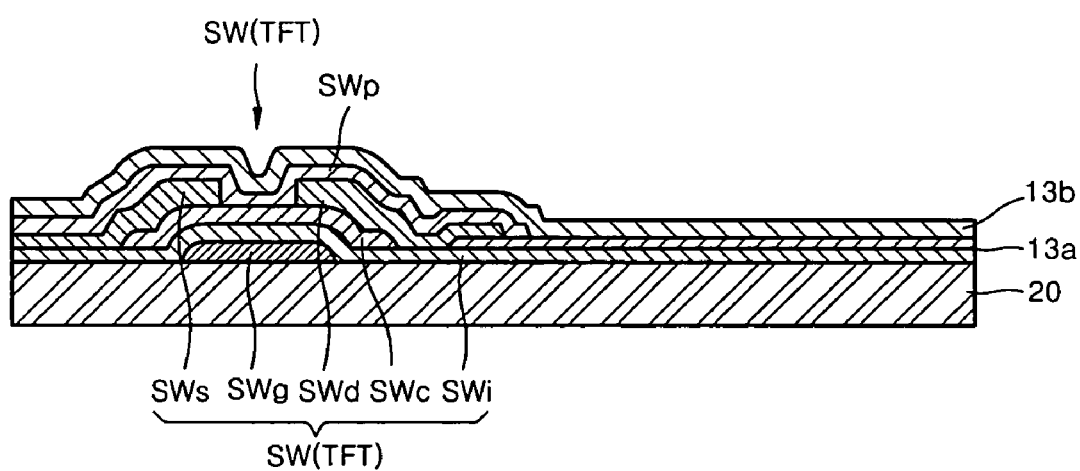
FIG. 10 is a cross-sectional view illustrating a structure of a switching element and a pixel electrode in the LCDs of FIG. 7, according to an embodiment of the present invention.

FIG. 10 is a cross-sectional view illustrating a vertical structure of a switching element SW, which is a thin film transistor (TFT), and a pixel electrode which is connected to the switching element SW, in the LCDs of the embodiments of the present invention. Referring to FIG. 10, the switching element SW has a bottom gate structure in which a gate SWg is disposed below a silicon channel SWc. More specifically, the gate SWg is formed on one side of the rear plate 20 and a gate insulating layer SWi is formed over the rear plate 20. The silicon channel SWc is formed on a portion of the gate insulating layer SWi immediately above the gate SWg and a transparent indium tin oxide (ITO) pixel electrode 13a is formed on another portion of the gate insulating layer SWi and adjacent to the silicon channel SWc. A source SWs and a drain SWd are formed on either side of the silicon channel SWc and a passivation layer SWp is formed on the source SWs and drain SWd. The drain SWd extends onto the pixel electrode 13a and is electrically connected to the pixel electrode 13a. A lower alignment layer 13b is formed on the entire surface of the switching element SW and the pixel electrode 13a. The lower alignment layer 13b is in contact with LCs and aligns the LCs in a specific orientation.

Although the present invention has been described with reference to a TFT active matrix LCD, the present invention is not limited thereto. According to another exemplary embodiment of the present invention, a simple matrix LCD without any switching element may be used.

In the present invention, light emitted form a light emitting layer is reflected to the front direction of a front plate, thereby increasing the amount of light to enhance image quality and the light utilization efficiency. In addition, the PL LCD can prevent the excitation of a light emitting layer due to external light and the subsequent degradation of the contrast ratio, thereby providing a high quality image having high luminance and a high light utilization efficiency.

While the present invention has been particularly shown and described with reference to exemplary embodiments thereof, the invention should not be construed as being limited to the embodiments set forth herein; rather, these embodiments are provided so that this disclosure will be thorough and complete, and will fully convey the concept of the invention to those skilled in the art. It will be understood by those of ordinary skill in the art that various changes in structure and arrangement may be made therein without departing from the spirit and scope of the present invention as defined by the following claims.

What is claimed is:

1. A photo-luminescent (PL) liquid crystal display (LCD), comprising:
   a backlight unit generating blue light;
   a liquid crystal layer defining a plurality of red, green, and blue pixels and switching blue light from the backlight unit to control the passage of the blue light through the pixels defined for each color and a liquid crystal driving unit driving the liquid crystals;
   a light emitting layer respectively corresponding to the each pixel; and
   a blue dichroic mirror layer disposed between the light emitting layers and the backlight unit, the blue dichroic mirror layer transmitting blue light from the backlight unit and reflecting red light and green light emitted from the light emitting layer, wherein the light-emitting layer corresponding to the blue pixel does not include phosphor.

2. The PC LCD of claim 1, wherein a portion of the light emitting layer corresponding to the blue pixels comprises quantum dots.

3. The PC LCD of claim 2, wherein the quantum dots are formed of II-IV or III-V compounds.

4. The PC LCD of claim 1, wherein a red phosphor layer in the light emitting layer is selected from the group consisting of (Sr,CaS):Eu2+, (Sr,Ca) 2Si5N8:Eu2+, and Mg4GeO 5.5 F:Mn4+,
wherein a green phosphor layer in the light emitting layer is selected from the group consisting of SrGa2S4:Eu2+, (Ba,Sr)SiO4:Eu2+, MgSi2O7, SrAl2O4:Eu2+, Ca8Mg (SiO4 4Cl2:Eu2+, and (Cr,Ca)(Al,Si)2:Eu2+.

5. The PC LCD of claim 2, wherein a red phosphor layer in the light emitting layer is selected from the group consisting of (Sr,CaS):Eu2+, (Sr,Ca)2Si5N8:Eu2+, and Mg4GeO 5.5 F:Mn4+,
wherein a green phosphor layer in the light emitting layer is selected from the group consisting of SrGa2S4:Eu2+, (Ba,Sr)SiO4:Eu2+, MgSi2O7, SrAl2O4:Eu2+, Ca8Mg (SiO4 4Cl2:Eu2+, and (Cr,Ca)(Al,Si)2:Eu2+.

6. The PC LCD of claim 4, further comprising an ultraviolet (UV) filter for blocking external UV light and preventing absorption of UV light into the light emitting layer.

7. The PC LCD of claim 5, further comprising an ultraviolet (UV) filter for blocking external UV light and preventing absorption of UV light into the light emitting layer.

8. The PC LCD of claim 6, wherein the UV filter is selected from the group consisting of para-aminobenzoic acid (PABA) derivatives, cinnamate derivatives, salicylic acid derivatives, benzophenone and its derivatives, and antharanilate and its derivatives.

9. The PC LCD of claim 7, wherein the UV filter is selected from the group consisting of para-aminobenzoic acid (PABA) derivatives, cinnamate derivatives, salicylic acid derivatives, benzophenone and its derivatives, and antharanilate and its derivatives.

10. The PC LCD of claim 6, wherein the UV filter is selected from the group consisting of zinc oxide, titanium dioxide, iron oxide, and magnesium oxide.

11. The PC LCD of claim 1, further comprising a UV filter blocking external UV light and preventing absorption of UV light into the light emitting layers.

12. The PC LCD of claim 2, further comprising a UV filter blocking external UV light and preventing absorption of UV light into the light emitting layers.

13. The PC LCD of claim 3, further comprising a UV filter blocking external UV light and preventing absorption of UV light into the light emitting layers.

14. The PC LCD of claim 11, wherein the UV filter is selected from the group consisting of para-aminobenzoic acid (PABA) derivatives, cinnamate derivatives, salicylic acid derivatives, benzophenone and its derivatives, and antharanilate and its derivatives.

15. The PC LCD of claim 11, wherein the UV filter is selected from the group consisting of zinc oxide, titanium dioxide, iron oxide, and magnesium oxide.

* * * * *